United States Patent [19]

Ford

[11] 4,006,891
[45] Feb. 8, 1977

[54] CRUCIBLE FOR MELTING SUPER-ALLOYS

[75] Inventor: David Alan Ford, Bristol, England

[73] Assignee: Rolls-Royce (1971) Limited, Great Britain

[22] Filed: July 9, 1976

[21] Appl. No.: 703,818

[30] Foreign Application Priority Data

July 25, 1975 United Kingdom ............. 31095/75

[52] U.S. Cl. ................................ 266/284; 266/275
[51] Int. Cl.² ........................................ F27B 14/10
[58] Field of Search ................. 266/275, 280, 284; 432/156

[56] References Cited

UNITED STATES PATENTS 3,141,917  7/1964  Duncan ........................ 266/284

Primary Examiner—Gerald A. Dost
Attorney, Agent, or Firm—Stevens, Davis, Miller & Mosher

[57] ABSTRACT

A crucible for melting a nickel-based superalloy containing one or more of the elements aluminium, titanium and hafnium is made of magnesia grains bonded by tinania, hafnia or yttria. The purity of the magnesia is not less than 97%.

4 Claims, No Drawings

CRUCIBLE FOR MELTING SUPER-ALLOYS

This invention relates to crucibles for melting super-alloys. More specifically the invention relates to crucibles made of magnesia grains bonded by a bonding medium and used for melting and casting nickel-based superalloys containing aluminium, titanium or hafnium.

The melting temperatures of such alloys lie in the range of 1400° to 1600° C. Unless otherwise specified herein the term "melting temperature" includes the temperature at which the metal is cast and which may be higher than the liquidus temperature of the metal. In said temperature range the bonding media of known crucibles react with said aluminium, titanium or hafnium to form compounds which are liquid at said range and which can therefore enter the melt to form an undesirable inclusion therein.

Bonding media which react in this way are especially those containing calcium e.g. calcium aluminate. It may also happen that calcium occurs as an impurity in solid solution in the magnesia, and if the extent of the impurity is sufficiently high for the calcium to form bonds between the magnesia grains, then such bonding calcium will also react as described. Known bonding media such as magnesium sulphate or iron oxide also form, at said temperature range, reaction products which are undesirable in said alloys.

It is an object of this invention to reduce or overcome this difficulty.

According to this invention there is provided a crucible for melting a nickel-based superalloy containing one or more of the elements of the group consisting of aluminium, titanium and hafnium wherein the crucible is made of a material consisting, by weight of 90 – 99% magnesia grains and 1 – 10% of an oxide being a bonding medium for the magnesia grains and being one of the group consisting of titania, hafnia and yttria, wherein the purity of the magnesia is not less than 97%.

Titania, hafnia and yttria are oxides which at the temperature range mentioned, are inert as regards the formation of liquid slags by reaction with aluminium, titanium or hafnium. In other words, insofar as there is reaction between said oxides and said metals the reaction product remains solid at the wall of the crucible and does not contaminate the melt.

EXAMPLE

A crucible was made having a composition by weight percent:

| Magnesia | MgO | 95 |
| Titania | TiO$_2$ | 2 |
| Calcia | CaO | 2 |
| Silica | SiO$_2$ | 1 |

The calcia and silica were present as impurities. The magnesia itself had a purity of 97% and the titania a purity of 98%. Both such purities are commercially available.

The magnesia was granular with a grain size of 50 – 2000 micron. The titania was a powder with a particle size of approximately 50 micron.

The materials were thoroughly mixed, bearing in mind that the titania is required to be a bonding agent for the magnesia grains. The mix was then filled into a suitable mould, was compacted therein, and on removal from the mould was fired at a temperature of 1650° C. The compacting of a mix, in a suitable mould and subsequent firing are operations well known per se and need not be further described. However, it may be explained in the context of using titania as the bonding medium for the magnesia that these two materials readily form a eutectic having a melting temperature of about 1570° C so that a good bonding of the magnesia grains is obtained at a firing temperature of 1600 to 1650° C.

The crucible was used for melting under vacuum of an alloy having the following composition by weight percent:

| Carbon | 0.17 | Titanium | 4.7 |
| Chromium | 9.5 | Zirconium | 0.06 |
| Molybdenum | 3.0 | Boron | 0.015 |
| Cobalt | 15.0 | Vanadium | 0.9 |
| Aluminium | 5.5 | Nickel | remainder |

The alloy was raised to a temperature of 1450° C which is about 140° C above its liquidus temperature. No liquid slag was discernible at the surface of the melt and metallurgical examination of castings made from the melt showed no slag inclusion of titanium aluminate or titanium titanate such as might be expected by reaction between the titania of the crucible and the titanium or aluminium of the alloy. However, aluminium and titanium compounds were found at the surface of the crucible when the latter was analysed.

This distinguished clearly from experience with melting the same alloy in crucibles where magnesia grains were bonded with calcium silicate which reacts with the alloy to form a liquid slag clearly visible at the surface of the melt and later identified as calcium aluminate.

It is explained that calcia is one of the most common impurities found in solid solution in magnesia and if the magnesia contains more than 2–3% of calcia, the latter emerges from the solution to form bonds between magnesia grains. Such bonding calcia is then available to form compounds with the aluminium, titaniu, or hafnium of the alloy, which compounds form a liquid slag in the temperature range relevant to the melting and casting of the alloy, i.e. the range of 1400°–1600° C.

As, mentioned, the use of titania as a bonding medium does not produce a liquid reaction product with aluminium or titanium of the alloy, i.e. the relevant products such as titanium aluminate, titanium titanate or (if hafnium is present in the alloy) titanium hafnate all have a melting temperature above 1600° C.

Magnesia itself is inert as far as the alloy is concerned. At least such small quantities of magnesium aluminate or magenesium hafnate as are formed at the crucible surface are solid in said temperature range.

Apart from titania, it has been found that hafnia (hafnium oxide) and yttria (yttrium oxide) are inert in said temperature range relative to aluminium, titanium and hafnium and that hafnia and yttria are good bonding agents for magnesia grains. Consequently those oxides may be used in the place of titania.

I claim:

1. A crucible for melting a nickel-based superalloy containing one or more of the elements of the group consisting of aluminium, titanium and hafnium, wherein the crucible is made of a material consisting by weight of 90 – 99% magnesia grains and 1 – 10% of an oxide being a bonding medium for the magnesia grains and being one of the group consisting of titania, hafnia and yttria, and wherein the purity of the magnesia is not less than 97%.

2. Crucible according to claim 1, wherein the crucible material includes as a permissible impurity up to 3% of at least one of the oxides of the group consisting of calcia and silica.

3. Crucible according to claim 1, wherein the crucible material consists by weight of 94–96% magnesia grains, 1–3% titania powder as said bonding medium, and as a permissible impurity 3% of at least one of the oxides of the group consisting of calcia and silica.

4. Crucible according to claim 1, wherein the magnesia includes as a permissible impurity not more than 2% calcia.

* * * * *